(12) United States Patent
Yatsuda et al.

(10) Patent No.: US 7,648,188 B2
(45) Date of Patent: Jan. 19, 2010

(54) GLASS RUN MOUNTING STRUCTURE

(75) Inventors: Atsushi Yatsuda, Aichi-ken (JP); Yoshio Hashimoto, Aichi-ken (JP); Masanori Aritake, Aichi-ken (JP); Satoshi Toki, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 254 days.

(21) Appl. No.: 11/802,534

(22) Filed: May 23, 2007

(65) Prior Publication Data
US 2007/0271853 A1 Nov. 29, 2007

(30) Foreign Application Priority Data
May 25, 2006 (JP) .......................... P-2006-144816

(51) Int. Cl.
*B60J 1/08* (2006.01)
(52) U.S. Cl. .................................... 296/146.2
(58) Field of Classification Search ............... 296/146.2
See application file for complete search history.

(56) References Cited
U.S. PATENT DOCUMENTS

| | | | |
|---|---|---|---|
| 5,365,698 A | 11/1994 | Nozaki | |
| 6,138,414 A | 10/2000 | Ohmori et al. | |
| 6,243,989 B1 | 6/2001 | Nozaki | |
| 6,389,754 B2 | 5/2002 | Nozaki | |
| 6,412,226 B1 | 7/2002 | Nozaki et al. | |
| 6,493,992 B2 | 12/2002 | Goto | |
| 6,625,931 B2 | 9/2003 | Omori et al. | |
| 6,723,414 B2 * | 4/2004 | Aritake et al. ............ | 296/146.2 |
| 6,792,718 B2 | 9/2004 | Nozaki | |

FOREIGN PATENT DOCUMENTS

| | | |
|---|---|---|
| JP | 2001-206070 | 7/2001 |
| JP | 2002-274188 | 9/2002 |

\* cited by examiner

*Primary Examiner*—Lori L Lyjak
(74) *Attorney, Agent, or Firm*—McGinn IP Law Group, PLLC

(57) ABSTRACT

A vehicle door includes a glass run which corresponds to an outer peripheral configuration of a door glass. The glass run includes a body portion which is provided with a bottom wall portion and an interior side wall portion and an exterior side wall portion which extend from both edges of the bottom wall portion, respectively, and a pair or seal lips which establish seals between the door glass and themselves. Furthermore, with respect to a direction towards an inside or outside of a door frame, a foot portion of the exterior seal lip is positioned further on the outer peripheral side than an inner-peripheral edge portion of a molding member.

10 Claims, 2 Drawing Sheets

GLASS RUN MOUNTING STRUCTURE

BACKGROUND OF THE INVENTION

1. Field of the Invention

The present invention relates to a mounting structure of a glass run which is mounted on a door for a vehicle.

2. Related Art

A glass run is mounted on a vehicle door of a vehicle such as an automobile for sealing a peripheral edge of a vehicle door glass which moves up and down in the vehicle door. The glass run includes a body portion having a substantially U-shaped cross section provided with a bottom wall portion, and a pair of side wall portions which extend from opposite edges of the bottom wall portion, and a pair of seal lips which seal the door glass.

A general glass run mounting structure, which is taken as one example, has a structure in which a glass run is fitted in a sash having a substantially U-shaped cross section which is provided on a door frame, or a so-called sash type mounting structure. However, in a case where no channel portion such as the sash or the like is provided due to a structural limitation of the door frame, other mounting structures have to be adopted. For example, a configuration in which a glass run is fitted in between an interior side panel member and an exterior side panel member such as a molding portion which form a door frame without using a channel portion or a so-called hidden type mounting structure in which the door frame is hidden is raised.

To match the recent trend of flush surface designing, in both the types of glass run mounting structures that have been described above, a molding lip which extends from the exterior side wall portion of the body portion of the glass run does not extend around the exterior panel member as far as an exterior side of the door frame (i.e. exterior side of the exterior side panel member), so that the exterior side surface of the door frame and the exterior side surface of the door glass are configured so as to be substantially flush with each other (refer, for example, to JP 2001-206070A and JP 2002-274188A.).

In both the types of glass run mounting structures described above in which the flush surface is attempted to be realized, since the door glass moves up and down while pushing the exterior seal lip towards the exterior side of the vehicle in a position where the door glass is offset towards the exterior side of the vehicle, there has been a contemplated fear that the exterior seal lip is turned back at a vertical section of the glass run so as to be turned to the exterior side of the vehicle.

It is considered as a reason for the contemplated fear that in addition to the fact that to match the trend of flush surface designing, the molding lip or the like which extends from the exterior side wall portion of the body portion of the glass run cannot be caused to extend around the exterior side panel member as far as the exterior side surface of the door frame, a connecting portion on the glass run where the exterior seal lip connects to the exterior side wall portion (a foot portion of the exterior seal lip) is positioned on an inner-peripheral side of an inner-peripheral edge of the exterior side panel member forming the door frame, and no wall portion exists which restricts a movement of the connecting portion to the exterior of the vehicle, whereby in the event that a pressure is applied to the exterior seal lip when the door glass moves up and down, the connecting portion escapes towards the exterior side of the vehicle.

SUMMARY OF THE INVENTION

The invention was made with a view to solving the problem, and an object thereof is to provide a glass run mounting structure which can prevent the turning back or the like of the exterior seal lip.

Hereinafter, some aspects of the invention which are suitable for solving the problem will be itemized for description.

(1) a glass run mounting structure comprising:
  a door frame of a vehicle door in which a door glass moves up and down, provided with an interior side panel member and an exterior side panel member;
  a glass run mounted between the interior side panel member and the exterior side panel member so as to seal a peripheral edge of the door glass, the glass run comprising:
    a body portion including a bottom wall portion, an interior side wall portion and an exterior side wall portion which extend from opposite ends of the bottom wall portion, and
    an interior seal lip and an exterior seal lip which extend from the interior side wall portion and the exterior side wall portion, respectively, toward an inside of the body portion;
  wherein at least in a vertical section of the glass run corresponding to a vertical edge of the door glass, a foot portion of the exterior seal lip is positioned on a outer-peripheral side of an inner-peripheral edge portion of the exterior side panel member.

According to the above, even in the glass run which is mounted on the exterior side surface of the exterior side panel member in a non-contact state, that is, the glass run configured so as to realize the flush surface in which the exterior side panel member is held by the molding lip or the like, whereby no movement to the exterior side of the vehicle can be restricted, since the movement of the foot portion of the exterior seal lip towards the exterior side of the vehicle can be restricted by the exterior side panel member, a pressure applied to the exterior seal lip when the door glass moves up and down can be supported by the exterior side panel member, thereby making it possible to suppress the occurrence of the problem that the exterior seal lip turns back. Note that the description describing, "a foot portion of the exterior seal lip is positioned on an outer-peripheral side of an inner-peripheral edge portion of the exterior side panel member" means at least, "a central position of a foot portion of the exterior seal lip in a thickness direction is positioned on an outer-peripheral side of an inner peripheral edge portion of the exterior side panel member (i.e. on a side toward the outside of the frame)." However, in order to ensure the obtaining of the aforesaid function and advantage, it is more preferable that an inner-peripheral edge portion of the foot portion of the exterior seal lip in the thickness direction thereof is positioned further on the outer peripheral side of the inner-peripheral edge portion of the exterior side panel member.

(2) In the glass run mounting structure of the invention, the foot portion of the exterior seal lip may be located in a position which is spaced 0.5 mm or more to 2.0 mm or less away from the inner-peripheral edge portion of the exterior side panel member on the outer peripheral side.

In the event that the spacing distance between the inner-peripheral edge portion of the exterior side panel member and the foot portion of the exterior seal lip exceeds 2.0 mm, there is a fear that it becomes difficult to secure the appropriate sealing properties, whereas in the event that the spacing distance lowers to be less than 0.5 mm, there is a fear that it becomes difficult in practice to obtain the function and advantage provided by the paragraph (1). Namely, according to the second aspect of the invention, the degree of such a drawback is decreased.

(3) In the glass run mounting structure of the invention, the exterior side panel member may be provided with a molding member which is made of a bright metal or a resin.

As in the paragraph (3), in the event that the exterior side panel member is provided with the molding member which is made of a bright metal or a resin, since a molding lip cannot be caused to extend round as far as the exterior side surface of the exterior side panel member also the viewpoint of external design of the vehicle, the glass run mounting structure of the invention provides more advantage. As an example of a configuration, a configuration is raised in which the glass run is fitted in without using a channel portion.

(4) In the glass run mounting structure of the invention, the door frame may include a channel portion (sash) in which the glass run is fitted between the interior side panel member and the exterior side panel member.

As an example of the channel portion, a configuration is raised in which a channel portion is formed integrally with at least one of the interior side panel member and the exterior side panel member or a channel portion is joined additionally to the interior side panel member and the exterior side panel member.

(5) In the glass run mounting structure of the invention, the glass run may include a lip portion which is formed on the exterior side wall portion and positioned on an inner-peripheral side of the exterior seal lip so as to extend towards the inside (inner-peripheral side) of the door frame and towards an interior side of a vehicle substantially from a distal edge of the exterior side wall portion.

Also in a configuration in which a flush surface is attempted to be realized in the conventional manner, a recess (or a step) is formed more or less between the exterior side panel member and the exterior side surface of the door glass, and hence, there is caused a fear that when the vehicle is driven, an air flow is disturbed by the recess to thereby cause wind noise. Compared to this conventional configuration, with the paragraph (5), the exterior side surface of the exterior side panel member and the exterior side surface of the door glass are connected continuously in a smooth fashion, to thereby making it possible to suppress the generation of wind noise.

In addition, as has been described above, in the configuration in which the foot portion of the exterior seal lip is positioned further on the outer peripheral side than the inner-peripheral edge portion of the exterior side panel member, since the foot portion of the exterior seal lip is positioned deeper than the inner-peripheral edge portion of the exterior side panel member, a recess which is larger than the conventional recess is formed. As a result, there is a fear that the drawback described above appears more remarkably. Consequently, in a configuration like this, the paragraph (5) provides more advantage.

DETAILED DESCRIPTION OF THE PREFERRED EMBODIMENTS

Figure 1:
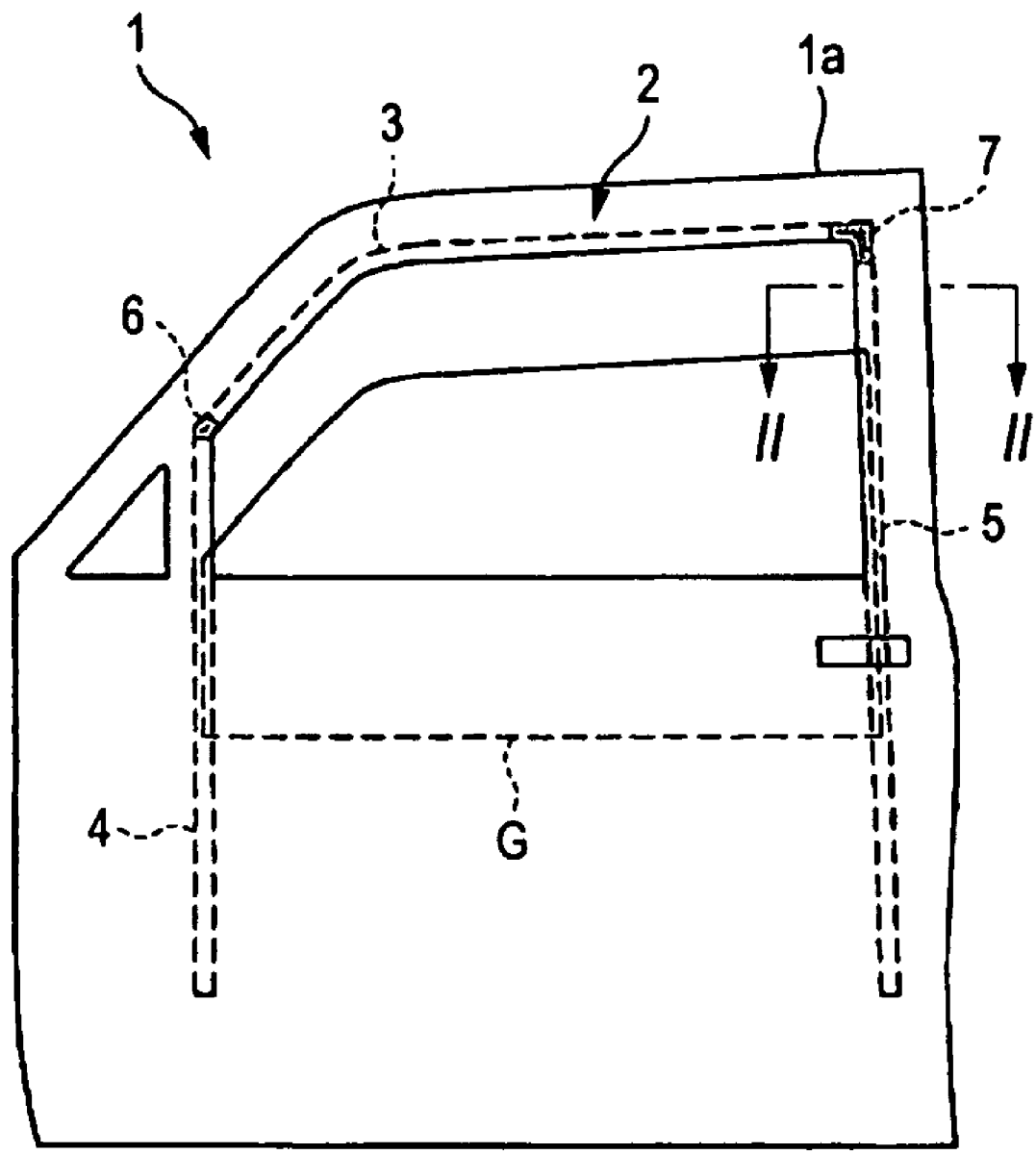
FIG. 1 is a front view of a door to which a glass run is assembled.

Hereinafter, an embodiment of the invention will be described in detail by reference to the drawings. As is shown in FIG. 1, a vehicle door (a front door in the drawing: hereinafter, referred to simply as a "door") which is a door for a vehicle that is provided to be opened and closed in an opening in a vehicle body of an automobile includes a door glass G and a glass run 2 made of an EPDM (ethylene-propylene-diene copolymer rubber) to match an external configuration of the door glass G.

The glass run 2 is provided, as viewed in a longitudinal direction thereof, with an extruded portion 3 which corresponds to an upper side portion, extruded portions 4, 5 which correspond to front and rear vertical sections, and molded portions 6, 7 (that is, portions shaded with scattered dots in FIG. 1) which connect end portions of the respective extruded portions 3, 4, 5. The respective extruded portions 3 to 5 are formed substantially in a straight line (or in an elongated shape) by an extruding machine, not shown. In addition, the molded portions 6, 7 are molded together with the extruded portions 3, 4, 5 by a molding unit, not shown, in such a manner that the extruded portions 3 and 4 and the extruded portions 3 and 5 are connected together by the molded portions 6 and 7, respectively in such a state that predetermined angles are formed therebetween.

Figure 2:
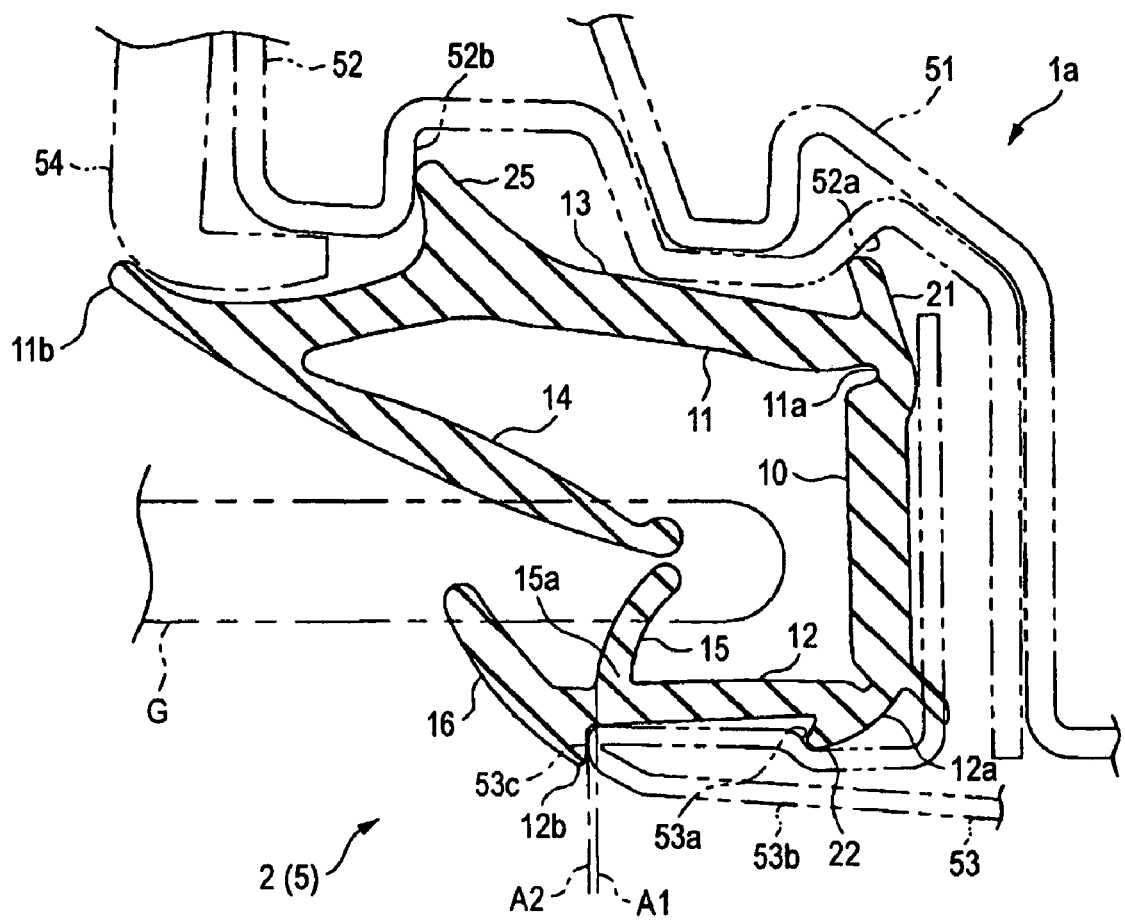
FIG. 2 is a sectional view taken along the line II-II in FIG. 1 which illustrates the glass run and a mounting structure thereof.

Next, referring to FIG. 2, the configuration of the glass run 2 and the configuration of a door frame 1a of a door 1 on which the glass run 2 is mounted will be described in detail based on the configuration of a vertical side of the door 1. FIG. 2 is a sectional view of a part shown in FIG. 1 which is taken along the line II-II shown therein.

A vertical side of the door frame 1a is provided with an inner panel 51 and a reinforcement panel 52 which form an interior side panel member which is provided on an interior side of the door glass G, and a molding member 53 and an interior member 54 which are mounted on the relevant panels 51, 52, respectively.

The molding member 53 is made of a bright metal or a resin and corresponds to an exterior side panel member which is provided on an exterior side of the door glass G. Namely, the door frame 1a in this embodiment is of a so-called hidden type in which an exterior side thereof is covered by the molding member 53 and has a construction in which a channel portion (a sash) having a substantially U-shaped cross section is not provided into which the glass run 2 is fitted. Because of this, the glass run 2 is to be mounted between the panels 51, 52 and the molding member 53. In addition, the interior member 54 is mounted in such a manner as to cover an inner-peripheral side of the reinforcement panel 52.

Next, the configuration of the vertical section (or the extruded element) 5 of the glass run 2 will be described. The vertical section 5 of the glass run 2 is provided with a body portion 13 having a substantially U-shaped cross section which is provided, in turn, with a bottom wall portion 10 and an interior side wall portion 11 and an exterior side wall portion 12 which extend from opposite edges of the bottom wall portion 10, respectively, and an interior seal lip 14 and an exterior seal lip 15 which extend into an inside of the body portion 13 from the interior side wall portion 11 and the exterior side wall portion 12, respectively, to establish seals between the door glass G and themselves and a sub-seal lip 16 which functions as a lip portion which extends inwards in a direction towards the inside (namely, inner-peripheral side) of the door frame (leftwards in FIG. 2) and towards an interior side of the vehicle (upwards in FIG. 2) substantially from a distal end of the exterior side wall portion 12 generally symmetrically with the exterior seal lip 15.

In addition, various locking portions are provided on an outer peripheral side of the body portion for holding the glass run 2 on to the inner-peripheral side of the door frame 1a. To be more specific, locking lips 21, 22 are formed on the interior side wall portion 11 and the exterior side wall portion 12, respectively, in the vicinity of connecting portions 11a, 12a with the bottom wall portion 10 in such a manner as to project from the body portion. In addition, in such a state that the glass run 2 is mounted, the interior side locking lip 21 is locked to an inclined portion 52a formed on the reinforcement panel 52. On the other hand, the exterior side locking lip 22 is locked to an inclined portion 53a formed on the molding member 53. Furthermore, a holding lip 25 is formed substantially at a central portion of the exterior side wall portion in an extending direction thereof in such a manner as to extend towards the outside of the body portion. In addition, in such a state that the glass run 2 is mounted, the holding lip 25 is locked to a stepped portion 52b formed on the reinforcement panel 52. In addition, a projecting portion 12b which projects to the outside of the body portion substantially from the distal edge of the exterior side wall portion 12 is brought into abutment with an inner-peripheral edge portion 53 of the molding member 53, and a cover lip 11b which extends substantially from a distal end of the interior side wall portion 11 overlaps the interior member 54. By this configuration, the body portion 13 of the glass run 2 is supported on the inner-peripheral side of the door frame 1a.

As is seen from the configuration that has been described above, in this embodiment, there is provided no such molding lip which extends around the molding member as far as an exterior side surface 53b of the molding member 53, and the glass run 2 is in such a state that the glass run 2 is not in contact with the exterior side surface 53b of the molding member 53, whereby a flush surface is realized in which the exterior side surface 53b of the molding member 53 and the exterior side surface of the door glass G are made substantially flush with each other. Furthermore, in this embodiment, the exterior side wall portion 12 is formed relatively short compared to the exterior side wall portion 11, and in association with this, the exterior seal lip 15 is set to be relatively small (short) compared to the interior seal lip 14, whereby the exterior side surface 53b of the molding member 53 can be set relatively small, and not only the design properties can be enhanced but also the door glass G is allowed to move up and down in the position which is offset towards the exterior side of the vehicle while securing an appropriate sealing amount.

In addition, in this embodiment, with respect to a longitudinal direction towards the inner-peripheral side or the outer-peripheral side of the door frame 1a (a leftward or rightward direction in FIG. 2), a foot portion 15a of the exterior seal lip 15 is positioned on the outer-peripheral side (rightwards in FIG. 2) of the inner-peripheral edge portion 53c of the molding member 53. To be specific, the position A1 of an inner-peripheral edge portion of the foot portion 15a of the exterior seal lip 15 in a thickness direction thereof (the leftward or rightward direction in FIG. 2) is set to a position which is spaced 0.7 mm in the direction towards the outside (outer-peripheral side) of the door frame away from the position A2 of the inner-peripheral edge portion 53c of the molding member 53.

By adopting the configuration that has been described in detail heretofore, even with the glass run 2 designed to realize a flush surface in which the glass run 2 is mounted on the exterior side surface 53b of the molding member 53 in a non-contact fashion, since the movement of the foot portion 15a of the exterior seal lip 15 towards the exterior side of the vehicle (downwards in FIG. 2) can be restricted by the molding member 53, the pressure applied to the exterior, seal lip 15 when the door glass G moves up and down can be supported by the molding member 53, thereby making it possible to suppress the occurrence of the drawback that the external seal 15 is turned back. Furthermore, the exterior side surface 53b of the molding member 53 and the exterior side surface of the door glass G can be connected continuously in a smooth fashion, thereby making it possible to suppress the generation of wind noise and the like.

Note that the invention is not limited to the embodiment, and hence may be carried out in the following manners. Of course, other application examples and modification examples which will not be illustrated in the following description can naturally be adopted as well.

(a) While in the embodiment, the invention has been described as being applied specifically to the mounting structure of the glass run 2 for the front door 1, the glass run mounting structure of the invention is not limited specifically to the door so positioned, and hence, the invention can be applied, for example, to a rear door.

In addition, the configuration may be adopted not only for the vertical section of the glass run which corresponds to the vertical edge of the door glass G but also for, for example, a top side portion thereof. As to the sub-seal lip 16, however, since there is a fear that the sub-seal lip 16 may be trapped by the door glass G when it moves up and down, the sub-seal lip 16 is not preferably provided on the top side portion 3.

(b) While in the embodiment, as the configuration example of the door frame 1a on which the glass run 2 is mounted, the hidden type configuration which has no channel portion (sash) is illustrated, the invention is not limited to such a type, and hence, other configurations may be adopted including, for example, a configuration in which a sash as a channel portion having a substantially U-shaped cross section is provided and a glass run 2 is fitted in the sash (a sash type configuration).

(c) In the embodiment, the inner-peripheral edge portion of the foot portion 15a of the exterior seal lip 15 as viewed in the thickness direction thereof is set to be positioned further on the outer peripheral side than the inner-peripheral edge portion 53c of the molding member 53. However, the invention is not limited thereto, and at least the position of the center of the foot portion 15a of the outside seal lip 15 in the thickness direction thereof may only have to be set to be positioned further on the outer peripheral side than the inner-peripheral edge portion 53c of the molding member 53.

(d) In the embodiment, the position A1 of an inner-peripheral edge portion of the foot portion 15a of the exterior seal lip 15 in the thickness direction thereof is set to a position which is spaced 0.7 mm in the direction towards the outside of the door frame away from the position A2 of the inner-peripheral edge portion 53c of the molding member 53. However, the setting position of the foot portion 15a of the exterior seal lip 15 is not limited thereto. However, the position A1 (or the center position in the thickness direction) of an inner-peripheral edge portion of the foot portion 15a of the exterior seal lip 15 in the thickness direction thereof is set to a position which is spaced 0.5 mm or more to 2.0 mm or less in the direction towards the outside of the door frame away from the position A2 of the inner-peripheral edge portion 53c of the molding member 53. As the reason for this, in the event that the distance between the two points A1, A2 exceeds 2.0 mm, there is a fear that it becomes difficult to secure the appropriate sealing properties, whereas in the event that the distance lowers to be less than 0.5 mm, there is a fear that it becomes difficult in practice to obtain the function and advantage of the embodiment.

(e) While in the embodiment, the sub-seal lip 16 is configured so as to be brought into abutment with the exterior side of the door glass G, the invention is not limited thereto, and hence, even in the event that a configuration is adopted in which the sub-seal lip 16 is configured so as not to be brought into abutment with the door glass G, the same function and advantage can be provided.

While the EPDM is described as being adopted as the elastic material from which the glass run of the embodiment is made, other materials may be adopted including, for example, a TPO (olefin-based thermoplastic elastomer) and the like.

What is claimed is:

1. A glass run mounting structure, comprising:
    a door frame of a vehicle door in which a door glass moves up and down, provided with an interior side panel member and an exterior side panel member; and
    a glass run mounted between the interior side panel member and the exterior side panel member so as to seal a peripheral edge of the door glass, the glass run comprising:
        a body portion including a bottom wall portion, an interior side wall portion and an exterior side wall portion which extend from opposite ends of the bottom wall portion, and
        an interior seal lip and an exterior seal lip which extend from the interior side wall portion and the exterior side wall portion, respectively, toward an inside of the body portion,
    wherein at least in a vertical section of the glass run corresponding to a vertical edge of the door glass, a foot portion of the exterior seal lip, located at a furthest point of the exterior seal lip from the bottom wall portion, is positioned closer to the bottom wall portion than an inner-peripheral edge portion of the exterior side panel member, which is a furthest edge of the exterior side panel member from the bottom wall portion.

2. A glass run mounting structure according to claim 1, wherein, with respect to said bottom wall portion, the foot portion of the exterior seal lip is located in a position which is spaced 0.5 mm or more to 2.0 mm or less away from the inner-peripheral edge portion of the exterior side panel member on an outer peripheral side.

3. A glass run mounting structure according to claim 1, wherein the exterior side panel member is provided with a molding member which comprises a bright metal or a resin.

4. A glass run mounting structure according to claim 1, wherein the door frame includes a channel portion in which the glass run is fitted between the interior side panel member and the exterior side panel member.

5. A glass run mounting structure according to claim 1, wherein the glass run further comprises a sub-seal lip which is formed on the exterior side wall portion and positioned on an inner-peripheral side of the exterior seal lip so as to extend towards an inside of the door frame and towards an interior side of a vehicle, substantially from a distal edge of the exterior side wall portion.

6. The glass run mounting structure according to claim 1, wherein an exterior side locking lip, formed on the exterior side wall portion in a vicinity of a connecting portion with the bottom wall portion and projected from the body portion, is locked to an inclined portion formed on the exterior side panel member.

7. The glass run mounting structure according to claim 6, wherein an interior side locking lip, formed on the interior side wall portion in a vicinity of a connecting portion with the bottom wall portion and projected from the body portion, is locked to an inclined portion formed on the interior side panel member.

8. The glass run mounting structure according to claim 1, wherein a holding lip is formed substantially at a central portion of the exterior side wall portion in an extending direction to extend towards an outside of the body portion, and said holding lip is locked to a stepped portion formed on the interior side panel member.

9. The glass run mounting structure according to claim 1, wherein the exterior side wall portion is shorter than the interior side wall portion, and
    wherein the exterior seal lip is shorter than the interior seal lip.

10. The glass run mounting structure according to claim 5, wherein a distal end of the sub-seal lip abuts an exterior side surface of the door glass.

* * * * *